United States Patent [19]

Fitko

[11] 4,012,270
[45] Mar. 15, 1977

[54] METHOD OF IMPROVING THE ADHESION OF PROPYLENE POLYMERS TO ENAMEL COATED METAL SURFACES

[75] Inventor: Chester W. Fitko, Chicago, Ill.
[73] Assignee: The Continental Group Inc., New York, N.Y.
[22] Filed: Sept. 25, 1975
[21] Appl. No.: 616,513
[52] U.S. Cl. .............................. 156/306; 156/309; 156/315; 156/330; 156/334; 220/359; 260/834; 260/837 R; 260/836; 427/386; 427/410; 428/416; 428/418
[51] Int. Cl.² .......................................... C09J 5/00
[58] Field of Search ............ 156/69, 313, 334, 309, 156/308, 330, 315, 306, 344, 247; 427/409, 386, 410, 388; 428/416, 515, 418, 516, 461, 523; 220/359; 260/834, 33.4 R, 836, 33.64 A, 837 R, 31.2 R, 34.2, 18 P, 23 EP, 21; 53/39

[56] References Cited

UNITED STATES PATENTS

| | | | |
|---|---|---|---|
| 2,838,437 | 6/1958 | Busse et al. | 156/308 |
| 3,222,420 | 12/1965 | Heppolette | 260/836 |
| 3,375,300 | 3/1968 | Ropp | 260/837 R |
| 3,467,730 | 9/1969 | Hicks | 260/837 R |
| 3,483,276 | 12/1969 | Mahlman | 260/33.4 R |
| 3,499,819 | 3/1970 | Lewis | 428/313 |
| 3,637,579 | 1/1972 | Barie et al. | 260/836 |
| 3,655,818 | 4/1972 | McKown | 260/837 R |
| 3,666,138 | 5/1972 | Morris et al. | 428/416 |
| 3,671,356 | 6/1972 | Keinanen | 156/309 |

Primary Examiner—Charles E. Van Horn
Assistant Examiner—J. J. Gallagher
Attorney, Agent, or Firm—Paul Shapiro; Joseph E. Kerwin; William A. Dittman

[57] ABSTRACT

Propylene polymers are heat sealed to enamel coated metal surfaces, the enamel having incorporated therein an adhesion promoting carboxyl modified polypropylene resin. The bond strength of the heat seal is improved by incorporating the carboxyl modified polypropylene resin in the enamel coating formulation dissolved in a hot (heated above 100° C) organic solvent solution selected from aliphatic acids, alcohols and hydrocarbons having at least 10 carbon atoms.

15 Claims, No Drawings

METHOD OF IMPROVING THE ADHESION OF PROPYLENE POLYMERS TO ENAMEL COATED METAL SURFACES

BACKGROUND OF THE INVENTION

1. Field of Invention

This invention relates generally to adhereing a propylene polymer layer to an enamel coated metal surface and more particularly to a method for effecting an increase in the bond strength of the heat seal between the surfaces.

2. The Prior Art

Easy opening containers are known to the art. These containers are generally formed of metal and are provided with at least one pour opening. The pour opening generally occupies only a portion of the end panel of the container. Heretofore, the pour opening has generally been formed by scoring to define a tear strip. A pull tab is attached to the tear strip, and upon the application of a force, the pull tab is operative to separate the tear strip from the panel along the score line.

Although easy opening containers have been readily accepted by the public, deficiencies still remain in this type of container. One of these deficiencies is that the removable tear strip which is torn form the end panel in the opening of the can has sharp edges, and when thrown on the ground or otherwise improperly disposed of, remains as a nuisance which presents a cutting hazard to the public.

It has been proposed e.g., U.S. Pat. No. 3,616,047, to replace the metal tear strip with a plastic layered closure member to eliminate the cutting hazard as the removed portion will not have sharp edges. The closure member fabricated entirely from a thermoplastic resin, such as polypropylene or a laminate of the resin and a metal foil such as aluminum or steel is heat sealed to the surface of an enamel coated end panel having at least one performed opening, the enameled surface of the panel having been coated with a heat activatable, bond promoting layer containing a carboxyl modified polypropylene resin.

It has been further proposed, e.g., in copending application, Ser. No. 616,530 filed Sept. 25, 1975, in the name of Ernesto H. Manuel, assigned to the same assignee, to incorporate the carboxyl modified polypropylene resin in the enamel coating so that the propylene polymer layer can be bonded directly to the enamel coated metal surface without the imposition of a separate adhesion promoting layer between the propylene polymer layer and the enamel coated metal layer as previously disclosed in U.S. Pat. No. 3,616,047.

One drawback to heat sealing propylene polymers directly to enamel coated metal surfaces having the carboxyl modified polypropylene incorporated therein is that the peel strengths of the seal are only marginally acceptable for easy open container closure manufacture.

SUMMARY OF THE INVENTION

In accordance with the present invention, there is provided a method of improving the bond strengths of propylene polymers heat sealed to enamel coated metal surfaces wherein a carboxyl modified polypropylene resin is incorporated in the enamel coating, the method comprising adding the carboxyl modified polypropylene resin in solvent selected from organic acids, alcohols and hydrocarbons having at least 10 carbon atoms, heating the organic solvent to a temperature above 100° C to dissolve the carboxyl modified polypropylene resin and then adding the resin solution, preferably at a temperature above 100° C, to a solution of enamel coating solids.

PREFERRED EMBODIMENTS

The carboxyl modified polypropylene which is utilized in the practice of the present invention is prepared by grafting an unsaturated dicarboxylic acid or anhydride onto a polypropylene backbone using high energy radiation or a peroxy catalyst as described in British Pat. No. 1,020,740. Unsaturated dicarboxylic acids or anhydrides which can be employed to prepare the carboxyl modified polypropylene resins include maleic, tetra-hydrophthalic acid, fumaric acid, itaconic, nadic, methyl nadic and their anhydrides, maleic anhydride being preferred.

The amount of unsaturated dicarboxylic acid or anhydride which can be grafted onto the polypropylene backbone ranges from abot 0.50 to about 10 percent by weight based on the total weight of the grafted polymer. The amount of carboxyl groups in the grafted polymer ranges from about 0.1 to about 5.0 percent by weight and preferably about 0.5 to about 4.0 percent by weight.

When the carboxyl modified polypropylene resin is utilized as an adhesion promoting adjutant for enamel coatings, the resin can be of any particle size and generally has a particle size of 0.05 to 50 microns and preferably a particle size of 35 to 40 microns.

Organic alcohols used to prepare solutions of the carboxyl modified polypropylene resin for incorporation in the enamel coating formulations in accordance with the present invention are long chain, saturated and unsaturated, aliphatic monohydroxy alcohols having the general formula R—OH where R is a straight or branched chained saturated or olefinic unsaturated hydrocarbon group having from 10 to 30 carbon atoms and preferably from 12 to 22 carbon atoms. Illustrative of such alcohols are decyl alcohol, tridecyl alcohol, lauryl alcohol, tetradecyl alcohol, cetyl alcohol, oleyl alcohol, linoleyl alcohol, palmitoleyl alcohol, arachidyl alcohol, stearyl alcohol, benhenyl alcohol, arachidonyl alcohol, myristoleyl alcohol and mixtures of these alcohols.

Organic acids which may be used as solvents for the carboxyl modified polypropylene resin include saturated and olefinic unsaturated aliphatic acids having 10 or more carbon atoms and preferably 12 to 22 carbon atoms such as the fatty acids as capric acid, lauric acid, myristic acid, palmitic acid, isostearic acid, stearic acid and arachidic acid, undecylemic acid, myristoleic acid, palmitoleic acid, oleic acid, cetoleic acid and erucic acid and mixtures of these acids.

Aliphatic hydrocarbons having 10 or more carbon atoms which may be used as solvents in the practice of the present invention include saturated hydrocarbons such as decane, iodecane, pentadecane, nepthadecane, nonadecane and mixtures or these hydrocarbons such as kerosene and mineral oil as well as unsaturated hydrocarbons and particularly unsaturated hydrocarbons having olefinic unsaturation such as undecene, tridecene and pentadecene.

It is an essential and critical feature of the present invention that the organic alcohol, acid or hydrocarbon solvent by an aliphatic compound and contain at least 10 carbon atoms. As will hereinafter be illustrated if a solvent other than an aliphatic compound containing at least 10 carbon atoms is used as a solvent for the carboxyl modified polypropylene resin, the incorporation of the resin in an enamel formulation dissolved in such solvents will not materially improve the heat seal bond between a propylene polymer and the enamel coating.

In preparing solutions of the carboxyl modified polypropylene resin for incorporation in the enamel coating formulation, the resin is added to the organic alcohol, acid or hydrocarbon solvent at a concentration of about 1 to about 30% by weight and preferably about 2 to about 10% by weight. After the resin is added to the solvent, the mixture is heated to a temperature above 100° C until the resin completely dissolves in the solvent. The resin solution is then added to the enamel coating formulation, preferably one which is an organic solvent solution of an epoxy resin and a cross-linking material such as a heat activatable aminoplast resin. It is preferred that the resin solution be at temperature above 100° C when added to the enamel coating formulation. As will hereinafter be illustrated, if the temperature of the resin solution is 100° C or less, gel formation is oberved and the strength of the heat seal bond between the propylene polymer and enamel coated metal surface is materially diminished.

The carboxyl modified polypropylene resin solution is added to the enamel coating solution in sufficient amounts so that the concentration of carboxyl modified polypropylene resin incorporated in the enamel coating formulation is in the range of about 0.01 to about 5% by weight and preferably about 0.1 to about 3% by weight of the solids content of the enamel coating formulation.

The solids content of the enamel coating compositions to which the solution of carboxyl modified polypropylene resin is added is comprised of about 60 to about 95 percent by weight of an epoxy resin and preferably about 70 to about 90 percent of the epoxy resin and about 5 to about 40 percent by weight of the aminoplast resin and preferably about 10 to 30 percent by weight of the aminoplast resin.

The epoxy resins employed in the invention of this application are the polymeric reaction products of polyfunctional halohydrins with polyhydric phenols having the structural formula:

The molecular weight of the epoxy resins may be controlled by the relative proportions of the reactants as well as by the extent to which the reaction is carried.

In the present invention, those epoxy resins which are of relatively high molecular weight are utilized in preparing the enamel coatings. Generally, epoxy resings having an average molecular weight in the range of 1400 to 5000 may be used.

Epoxy resins are available commerically. Preferred examples are EPON 1004, EPON 1007 and EPON 1009, products of Shell Chemical Company which are the condensation products of epichlorohydrin and Bisphenol A (2,2 bis (4-hydroxphenyl) propane and have a respective epoxy assay of 875 to 1025 and 2500 to 4000 grams of sample per gram mole of epoxy group (gram/gram mole). The average molecular weight of an epoxy resin is approximately twice the epoxy assay.

The aminoplast condensates employed in the enamel coating formulations are urea-aldehyde and triazine aldehyde resins and alcohol modified derivatives thereof, that is, alkylated amino resins wherein the alkyl radical contains from 2 to 8 carbon atoms. Such aminoplast resins are the reaction products of aldehydes, such as formaldehyde, with urea, substituted ureas, thioureas, ethylene urea, melamine, benzoquanamine, acetoguanamine and the like. The resulting methylol substituted products are etherified with alcohols, for example isopropanol, butanol and 2-ethyl hexanol, in order to obtain stability and organic solubility. Such organic soluble aminoplast resins are contemplated for use in this invention and butylated urea formaldehyde resins are preferred for use in the enamel coating formulations.

In preparing the enamel compositions of the present invention, the epoxy resin and aminoplast resin are dissolved in a solvent blend, such as a mixture of ketones, aromatic hydrocarbons, ether alcohols and ether alcohol esters until these components are completely dissoved. To the solvated enamel resins is then added the hot solution of the carboxyl modified polyropylene resin and these components are mixed until a homogenous mixture is obtained.

Suitable ketones which can be employed as solvents for epoxy resin-aminoplast resin based enamel coating formulations include methyl ethyl ketone, methyl iso-

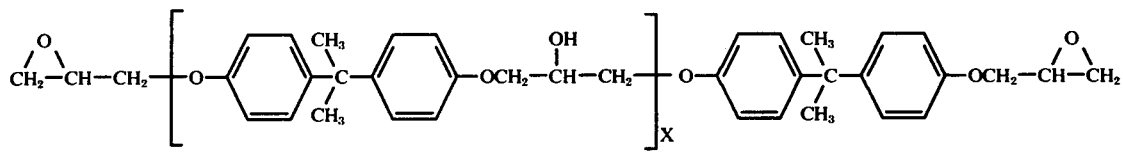

where X represents the number of molecules condensed. Typical polyfunctional halohydrins are epichlorohydrin, glycerol dichlorohydrin, and the like. Typical polyhydric phenols are resorcinol and a 2,2-bis (4-hydroxyphenyl) alkane, the latter resulting from the condensation of phenols with aldehydes and ketones, including formaldehyde, acetaldehyde, propionaldehyde, acetone, methyl ethyl ketone and the like, which result in such compounds as 2,2-bis (4-hydroxyphenyl) propane and like compounds. These epoxy resins normally contain terminal epoxy groups but may contain terminal epoxy groups and terminal hydroxyl groups.

butyl ketone, isophorone, cyclohexanone, diacetone alcohol and diisobutylketone. Aromatic hydrocarbon solvents useful as solvents for epoxy resin-aminoplast resin based enamel coating formulations include benzene, toluene, xylene, and commerically available aromatic naptha mixtures, such as Solvesso 100 or 150. An example of a useful ether alcohol is butyl cellosolve and an example of a useful ether alcohol ester is cellosolve acetate.

Antioxidants and thermal stabilizers may also be incorporated in the enamel coating formulation to inhibit oxidation of the carboxyl modified polypropylene resin during the baking and curing of the enamel coating after its application to metal surfaces. Antioxidant compounds which have been found useful in the practice of the present invention include hindered phenolic compounds such as Irganox 1010, tetrakis [methylene 3-(3', 5' - di-tert-butyl-4-hydroxyphenyl) propionate], which are incorporated in the enamel coating formulations at concentrations in the range of about 0.1 to 1.0% by weight based on the solids content of the enamel. Lubricants such as polyethylene dispersions may also be incorporated in the enamel which are required during forming of the enamel coated metal sheet in container end manufacture.

The enamel compositions having the carboxyl modified polypropylene resin incorporated therein in accordance with the method of the present invention can be satisfactorily applied at a solids content ranging from about 20% to about 50% by weight, based on the total weight of the liquid enamel coating formulation. Generally, a solids content of 30 to 45% by weight is preferred.

The enamel coating formulations containing the adhesion promoting carboxyl modified polypropylene resin can be satisfactorily applied by any of the conventional methods employed by the coating industry. However, for coating sheet metal of the type used in container fabrication, gravure or direct roller coating are preferred methods, as the desired coating weight is easily and conveniently applied in a single coat. Spraying, dipping and flow coating are also useful methods of applying the enamel coating formulation After applying the enamel coating, the coating is cured and hardened by heating the coated substrate at a temperature of about 350° to about 600° F for a period of about 20 minutes to about 1 minute.

The preferred coating weight for coating metal ends to which a propylene polymer closure may be heat sealed is in the range of 2.5 to 10.0 milligrams of dry coating per square inch of substrate surface to provide an enamel coated metal surface to which a propylene polymer layer can be heat sealed.

Propylene polymer layers which may be bonded to the enamel coated surface in accordance with the practice of the present invention include polypropylene and propylene/ethylene copolymers containing about 1% to 10% ethylene.

The propylene polymer layer is bonded to the enamel coated surface by heat sealing at a temperature range of about 350°–450° F and preferably at a temperature of 370° to 400° F. Heat sealing may be accomplished by any means known to the art, such as heated parts or wire and induction heating.

After the propylene polymer layer is heat sealed and bonded to the enamel coated metal surface, the assembly is allowed to cool to ambient temperature.

To illustrate the manner in which the present invention may be carried out, the following Examples are given. It is to be understood, however, that the Examples are for the purpose of illustration, and the invention is not to be regarded as limited to any of the specific materials or conditions recited therein.

EXAMPLE 1

Hot solvent solutions of a carboxyl modified polypropylene resin were prepared by adding 0.4 parts Hercoprime A-35 (trademark) to varying amounts of oleyl alcohol to prepare resin solutions ranging in concentration from 4 to 20 percent by weight. Hercoprime A-35 is a maleic anhydride modified polypropylene resin having an inherent viscosity of about 1.7, a carboxyl content of 0.6% to 1.0%, a particle size range of 35 to 40 microns and a specific gravity of 0.9.

The oleyl alcohol-Hercoprime mixture was heated to 155° C for 15 minutes during which time the Hercoprime dissolved in the oleyl alcohol. The hot solution at 155° C was then added slowly to a rapidly stirred solution of 100 parts of an epoxy resin based enamel coating formulation composed of a 40% by weight solids consisting of 85 parts of the digycidyl ether of Bisphenol A and 15 parts of a butylated urea formaldehyde suspended in an organic solvent mixture of approximately 25 parts xylene, 25 parts methyl isobutyl ketone 30 parts diacetone alcohol and 20 parts butyl alcohol. To the enamel coating formulation was also added 30 parts of cellosolve acetate as a diluent to adjust the flow and viscosity properties of the modified enamel formulation to that required for commercial coating specifications and 1.8 parts of polyethylene dispersion for lubricant properties. The resultant enamel formulation had a Hercoprime concentration of 1% by weight (based on enamel solids).

The modified enamel coating formulation was applied, by means of a draw bar, to the surface of a sheet of 95 lb. tinfree steel at a dried film weight of 3.5–4.5 mg/sq. in. of steel surface.

After application of the modified enamel coating formulation, the coated sheet was baked at 370° F for 8 minutes to volatilize the solvent mixture and to cure the epoxy-urea formaldehyde-carboxyl modified polypropylene resin solids mixture to a hard enamel film.

After cooling, the tin-free steel sheet was cut into 1 × 4 inch strips. A closure member having a laminate structure of 3.0 to 4.0 mil aluminum foil coated with a 1.5 to 2.0 mil layer of a polypropylene resin having a melt index of 0.55 and a density of 0.90 was heat sealed to the enamel coated strips of 400° F with the polypropylene layer in contact with the enamel coated surface at a 4 second dwell time and 40 lbs/sq. in. pressure. The closure member heat sealed to the strip was allowed to cool to room temperature.

The heat sealed portion of the closure member was then tested to determine the peel force required to separate the closure member from the enamel coated strip. The peel strengths necessary for commerical acceptance generally should be in excess of 1.5 lbs/lineal inch (PLI). The test was performed using an Amthor peel tester which applied a constant strain rate of 12 lineal inches per minute on the closure member. The peel forces required to separate the closure member are summarized in Table 1 below.

For purposes of comparison, the procedure of Example I was repeated with the exception that the carboxyl modified polypropylene resin was incorporated in the enamel coating directly without first dissolving the resin in oleyl alcohol. The peel force required to separate the closure member in this comparative run is also listed in Table I designated by the symbol "C".

TABLE I

| Run No. | Parts Hercoprime per 100 parts Oleyl Alcohol | Parts Oleyl Alc. per 100 Parts of Enamel | Peel Strength (PLI) |
| --- | --- | --- | --- |
| 1 | 20.0 | 2 | 1.9 |
| 2 | 10.0 | 4 | 3.3 |
| 3 | 6.7 | 6 | 5.5 |
| 4 | 5.0 | 8 | 7.5 |
| 5 | 4.0 | 10 | 9.2 |
| C | 0 | 0 | No Bond |

The data in Table I indicates that dissolving the carboxyl modified polypropylene resin in oleyl alcohol materially improves the bond strength of the heat sealed polypropylene layer of the closure member to the enamel coated steel surface and that the more dilute the solution of the resin or the greater the amount of alcohol used to dissolve the resin, the greater is the improvement in bond strength.

EXAMPLE II

The procedure of Example I was repeated with the exception that Alfol 1218 (trademark), a mixture of $C_{12}$–$C_{18}$ aliphatic alcohols was used to dissolve the Hercoprime. Alfol 1218 has the following composition:

| Alcohol | Wt. % |
|---|---|
| Dodecyl ($C_{12}$) | 40 |
| Myristyl ($C_{14}$) | 30 |
| Cetyl ($C_{16}$) | 20 |
| Stearyl ($C_{18}$) | 10 |

Alfol 1218 solvent solutions containing Hercoprime A-35 were prepared by adding 0.34 parts Hercoprime to varying amounts of Alfol 1218 to prepare resin solutions containing varying ratios of Hercoprime and Alfol 1218. In dissolving the Hercoprime, the Alfol 1218 was heated to 100°–120° C and the Hercoprime resin powder was added. Heating was continued to 150°–160° C and the hot solution was added to 100 parts of a rapidly stirred epoxy-urea formaldehyde resin mixture (40% solids in mixed solvent solution) at room temperature. To the enamel formulation was then added 0.1 part Irganox 1010 as a 10% solution in cellosolve acetate as well as additional (20 parts) cellosolve acetate diluent. The resultant enamel coating formulation contained 0.8% by weight (based on enamel coating solids) Hercoprime. The peel strengths of polypropylene coated aluminum closure members heat sealed to 1 × 4 inch enamel coated tin-free steel strips are recorded in Table II below.

For purposes of comparison, the procedure of Example II was repeated with the exception that the carboxyl modified polypropylene resin was incorporated in the enamel coating directly without first dissolving the resin in Alfol 1218. The peel force required to separate the closure member in this comparative run is also listed in Table II designated by the symbol "C".

TABLE II

| Run No. | Parts Hercoprime per 100 parts Alfol | Parts Alfol per 100 parts Enamel | Peel Strength (PLI) |
|---|---|---|---|
| 1 | 5.3 | 6 | 7.7 |
| 2 | 2.7 | 12 | 21.9 |
| 3 | 1.8 | 18 | 16.9 |
| 4 | 1.3 | 24 | 4.9 |
| C | 0 | 0 | No Bond |

The data in Table II indicates that dissolving the carboxyl modified polypropylene resin in a mixture of $C_{12}$–$C_{18}$ alcohols materially improves the bond strength of the heat sealed polypropylene layer of the closure member to the enamel coated steel surface and that the strongest peel strengths are achieved when a solution containing about 2.7% by weight of the resin is used, the bond strengths diminishing as more dilute solutions are employed.

EXAMPLE III

The procedure of Example I was repeated using a variety of $C_{12}$–$C_{22}$ organic alcohols and acids and $C_{10}$ and greater hydrocarbons having boiling points above 150° C as solvents for the Hercoprime. The solvent/Hercoprime weight ratio was maintained constant at 15:1. In dissolving the Hercoprime, the solvent material and the Hercoprime powder mixture was heated to 150°–160° C. The hot solution was added to the rapidly stirred epoxy-urea formaldehyde enamel at room temperature. To the enamel formulation was then added an Irganox 1010 as a 10% solution in cellosolve acetate as well as additional cellosolve acetate diluent. The resultant enamel coating formulation contained 1% by weight (based on enamel coating solids) Hercoprime and had the following composition:

| | Grams | Solids Content (Grams) |
|---|---|---|
| Epoxy-urea/formaldehyde suspension | 100.0 | 40 |
| Hercoprime | 0.4 | 0.4 |
| Solvent for Hercoprime | 6.0 | 0 |
| Irganox 1010 | 1.0 | 0.1 |
| Cellosolve acetate diluent | 25.0 | 0 |

The peel strengths of polypropylene coated aluminum closure members heat sealed to 1 × 4 inch enamel coated tin-free steel strips are recorded in Table III below, the enamel coatings having Hercoprime incorporated therein using different solvents within the scope of the present invention.

For purposes of comparison, the procedure of Example III was repeated with the exception that the Hercoprime resin was incorporated in the enamel coating formulation dissolved in a solvent outside the scope of the present invention. The peel forces required to separate the closure member heat sealed to these comparative enamel coatings are also listed in Table III. These comparative tests are designated by the symbol "C".

TABLE III

| Run No. | Solvent | Chemical Type | Temperature at which Hercoprime Resin Dissolves (° C) | Peel Strength (PLI) |
|---|---|---|---|---|
| 1 | Oleyl alcohol | $C_{18}$ Olefinic alcohol | 120 | 48.0 |
| 2 | Alfol 1218 | $C_{12}$–$C_{18}$ Aliphatic alcohol mixture | 120 | 10.5 |
| 3 | Cetyl alcohol | $C_{16}$ Aliphatic alcohol | 120 | 8.2 |
| 4 | Stearyl alcohol | $C_{18}$ Aliphatic alcohol | 120 | 5.1 |
| 5 | Tridecyl alcohol | $C_{13}$ Aliphatic alcohol | 120 | 3.5 |
| 6 | Arachidyl alcohol | $C_{20}$ Aliphatic alcohol | 120 | 2.2 |

TABLE III-continued

| Run No. | Solvent | Chemical Type | Temperature at which Hercoprime Resin Dissolves (° C) | Peel Strength (PLI) |
|---|---|---|---|---|
| 7 | Dodecyl alcohol | $C_{12}$ Aliphatic alcohol | 120 | 1.9 |
| 8 | Isostearic Acid | $C_{18}$ Aliphatic Acid | 130 | 2.9 |
| 9 | Oleic acid | $C_{18}$ Unsaturated carboxylic acid | 125 | 2.4 |
| 10 | Marine fatty acid | $C_{14}$–$C_{22}$ Fatty acid mixture | 120 | 2.2 |
| 11 | Mineral oil | $C_{20}$–$C_{26}$ Aliphatic hydrocarbons | 120 | 10.0 |
| 12 | Kerosene | $C_{10}$–$C_{16}$ Aliphatic hydrocarbon | 135 | 5.1 |
| 13 | Chevron Alpha Olefins | $C_{11}$–$C_{15}$ Olefin hydrocarbon mixture | 120 | 4.0 |
| 14 | 1-Dodecene | $C_{12}$ Unsaturated hydrocarbon | 115 | 1.1 |
| $C_1$ | Ethyl hexyl alcohol | $C_8$ Aliphatic alcohol | 125 | 0 |
| $C_2$ | Butyl alcohol | $C_4$ Aliphatic alcohol | Resin insoluble at boiling point | — |
| $C_3$ | Isopropanol | $C_3$ Aliphatic alcohol | Resin insoluble at boiling point | — |
| $C_4$ | Diacetone alcohol | Aliphatic ketoalcohol | Resin insoluble at boiling point | — |
| $C_5$ | Butyl cellosolve | Aliphatic glycol-ether | Resin partly soluble at 160° C | — |
| $C_6$ | Xylene | Aromatic hydrocarbon | 110° C | 0 |
| $C_7$ | 1,2,3,4,-Tetra hydro napthalene (tetralin) | Aromatic hydrocarbon | 90° C | 0 |
| $C_8$ | Diisobutyl ketone | Aliphatic ketone | Resin insoluble at boiling point | — |
| $C_9$ | Hydroxy ethyl azeliate | β-Hydroxy ethyl fatty acid ester | Resin insoluble at 150–160° C. | — |
| $C_{10}$ | Glyceryl monooleate | $C_{18}$ Olefinic ester | Resin insoluble | — |

The data in Table III shows Hercoprime when added to an enamel coating formulation dissolved in $C_{12}$–$C_{20}$ aliphatic alcohols and acids and $C_{10}$ or more aliphatic hydrocarbons results in enamel surfaces to which polyproylene may be heat sealed. Although Hercoprime is soluble in hot xylene, tetralin and ethyl hexyl alcohol, the enamel coatings, which were prepared using these hot solutions, did not form any heat seal bonds with polypropylene surfaces. Lower aliphatic alcohols such as butanol and isopropanol and other solvent materials such as butyl cellosolve, diacetone alcohol and methyl isobutyl ketone could not be used to incorporate Hercoprime in enamel coating formulations as Hercoprime is not soluble in these common organic solvents at their boiling points.

EXAMPLE IV

The procedure of Example III was repeated with the exception that the heat sealed structure was baked at 400° F for 15 seconds to simulate conditions encountered during manufacture of metal container ends. The results of these tests are recorded in Table IV below.

TABLE IV

| Run No. | Percent Hercoprime Based on Enamel Solids | Hercoprime Solvent | Peel Strengths (PLI) Before Bake | After Bake |
|---|---|---|---|---|
| 1 | 0.6 | Oleyl alcohol | 9.5 | 11.5 |
| 2 | 0.9 | Oleyl alcohol | 26.1 | 39.0 |
| 3 | 0.8 | $C_{12}$–$C_{18}$ Aliphatic* alcohol blend | 1.4 | 3.4 |
| 4 | 1.0 | Stearyl alcohol | 5.1 | 7.3 |

*Alfol 1218

The results in Table IV shown that the bond strenth of a polypropylene layer heat sealed to an enamel coating modified in accordance with the process of the present invention increases if the structure receives additional heating.

EXAMPLE V

The procedure of Example III was repeated to modify enamel coating formulations with oleyl alcohol solutions of Hercoprime A-35 with the exception that the temperature of the Hercoprime solution at the time of its addition to the enamel coating formulation was varied from 23° C to 155° C. The peel strengths of polypropylene coated aluminum closure members that sealed to 1 × 4 tin-free steel strips coated with the enamel coating formulations are recorded in Table V.

TABLE V

| Temperatures at which Hercoprime solution added to Enamel | Peel Strengths (PLI) | Comments |
|---|---|---|
| 155° C | 48 | Solution |
| 100° C | 6.1 | Gel |
| 23° C | 6.4 | Gel |

The results recorded in Table V indicate that superior bonding results are obtained with enamels modified with Hercoprime solutions heated to temperatures above 100° C at their time of addition to the enamel formulation. If the Hercoprime solution is cooled to temperatures of 100° C or less at the time of addition to the enamel formulation, the Hercoprime crystallizes out as gel which materially affects the bonding results with the enamel.

EXAMPLE VI

The procedure of Example III was repeated with the exception that Hercoprime G-35 was substituted for Hercoprime A-35. Hercoprime G-35 differs from Hercoprime A-35 in that Hercoprime G-35 has a carboxyl content of 3.0 to 4.0% and has a lower inherent viscosity. In dissolving Hercoprime G-35 in oleyl alcohol, the alcohol was heated to 120°–130° C and the Hercoprime powder added. Heating was continued to 150°–160° C and the hot solution added to the rapidly stirred epoxy-urea formaldehyde enamel at room temperature. To the enamel formulation was then added Irganox 1010 as well as cellosolve acetate diluent. The resultant enamel coating formulation contained 0.5–1% by weight (based on enamel coating solids) Hercoprime G-35 and had the following composition:

|  | Grams | Solid Content (Grams) |
|---|---|---|
| Epoxy-urea/formaldehyde suspension | 100.0 | 40 |
| Hercoprime G-35 | 0.2–0.4 | 0.2–0.4 |
| Oleyl alcohol | 6.0 | 0 |
| Irganox 1010 | 1.0 | 0.1 |
| Cellosolve acetate diluent | 25.0 | 0 |

The peel strengths of polypropylene coated aluminum closure members heat sealed to 1 × 4 inch enamel coated tin-free steel strips are recorded in Table VI.

TABLE VI

| % Hercoprime G-35 Added to Enamel | Peel Strength (PLI) |
|---|---|
| 1.0 | 42 |
| 0.5 | 45 |

What is claimed is:
1. A method of heat sealing a propylene polymer to a metal surface which comprises;
 a. preparing a solution of a carboxyl modified polypropylene resin by dissolving an adhesion promoting amount of the resin in a solvent heated to a temperature greater than 100° C, the solvent being selected from the group consisting of saturated and olefinic unsaturated aliphatic acids and alcohols having 10 to 22 carbon atoms and saturated and unsaturated hydrocarbons having 10 to 30 carbon atoms,
 b. adding the resin solution to an enamel coating formulation so that the modified enamel coating formulation is comprised of a solids mixture of about 60 to about 95% by weight of an epoxy resin about 5 to about 40% by weight of a urea formaldehyde resin and about 0.01 to about 5% by weight of the carboxyl modified polypropylene resin,
 c. applying the modified coating formulation to the metal surface,
 d. baking the modified coating formulation to cure and harden the coating,
 e. heat sealing a propylene polymer layer to the hardened enamel coated metal surface and then,
 f. cooling the heat sealed assembly to ambient temperature.
2. The method of claim 1 wherein the solvent is oleyl alcohol.
3. The method of claim 1 wherein the solvent is dodecyl alcohol.
4. The method of claim 1 wherein the solvent is myristyl alcohol.
5. The method of claim 1 wherein the solvent is cetyl alcohol.
6. The method of claim 1 wherein the solvent is stearyl alcohol.
7. The method of claim 1 wherein the solvent is tridecyl alcohol.
8. The method of claim 1 wherein the solvent is arachidyl alcohol.
9. The method of claim 1 wherein the solvent is oleic acid.
10. The method of claim 1 wherein the solvent is isostearic acid.
11. The method of claim 1 wherein the solvent is mineral oil.
12. The method of claim 1 wherein the solvent is 1-dodecane.
13. The method of claim 1 wherein the solvent is a mixture of $C_{11}$–$C_{15}$ olefin unsaturated hydrocarbons.
14. The method of claim 1 wherein the carboxyl modified polypropylene resin is the reaction product of polypropylene and an unsaturated dicarboxylic acid or anhydride containing about 0.1% to about 5.0% by weight carboxyl groups.
15. The method of claim 14 wherein the saturated anhydride is maleic anhydride.

* * * * *